P. RIEDELE.
BUMPER BRACKET HOLDER.
APPLICATION FILED FEB. 8, 1919. RENEWED NOV. 22, 1919.
1,329,019.
Patented Jan. 27, 1920.
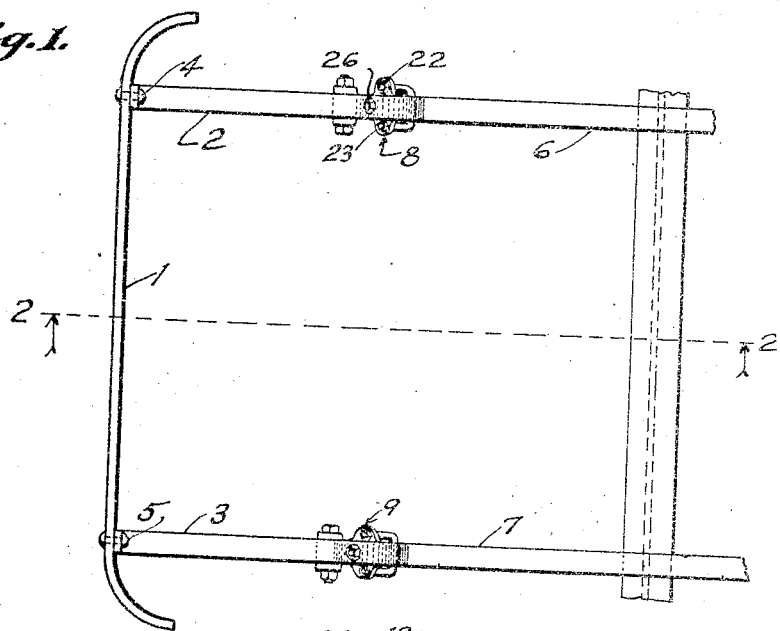
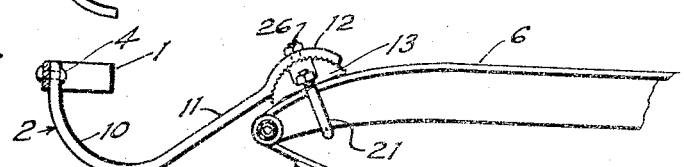
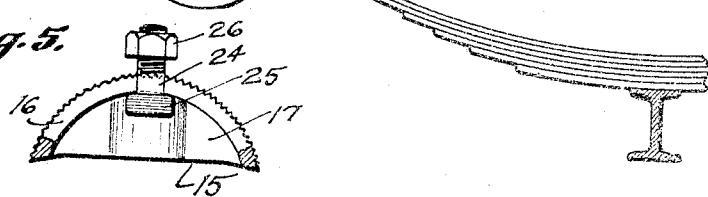
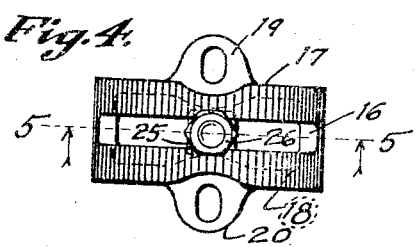
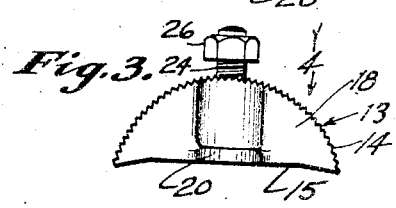
INVENTOR.
PHILIP RIEDELE.
BY Hazard & Miller
ATTORNEYS.

UNITED STATES PATENT OFFICE.

PHILIP RIEDELE, OF LOS ANGELES, CALIFORNIA.

BUMPER-BRACKET HOLDER.

1,329,019.      Specification of Letters Patent.      Patented Jan. 27, 1920.

Application filed February 8, 1919, Serial No. 275,898. Renewed November 22, 1919. Serial No. 339,932.

*To all whom it may concern:*

Be it known that I, PHILIP RIEDELE, a citizen of the United States, residing at Los Angeles, in the county of Los Angeles and State of California, have invented new and useful Improvements in Bumper-Bracket Holders, of which the following is a specification.

My object is to make an adjustable bumper bracket holder, and my invention consists of the novel features herein shown, described and claimed.

Specifically my object is to mount an automobile bumper so that the bumper may be readily raised or lowered relative to the ground.

Figure 1 is a top plan view of a bumper showing bumper bracket holders embodying the principles of my invention, the holders being attached to automobile side bars and the side bars being broken away.

Fig. 2 is a vertical longitudinal sectional detail on the line 2—2 of Fig. 1 and looking in the direction indicated by the arrow.

Fig. 3 is a side elevation of the bumper bracket holder base with the other parts removed.

Fig. 4 is a top plan view looking in the direction indicated by the arrow 4 in Fig. 3.

Fig. 5 is a vertical longitudinal section on the line 5—5 of Fig. 4 and on a plane parallel with Fig. 3.

The bumper 1 is secured to brackets 2 and 3 by bolts or rivets 4 and 5, and the rear ends of the brackets 2 and 3 are secured to the side bars 6 and 7 by bumper bracket holders 8 and 9.

The bumper bracket holders 8 and 9 are identical in construction, and in Figs. 2, 3, 4 and 5 I have shown the details of the bumper bracket holder 8.

The bumper bracket 2 is slightly S-shaped in side elevation, there being a curve 10 in the forward half of the bracket with the forward upper end of the curve being in vertical position, a straight portion 11 extending backwardly and upwardly from the rear end of the curve 10, and a segmental gripping plate 12 at the rear end of the straight portion 11, there being a bolt hole through the center of the gripping plate.

The gripping plate 12 adjustably fits the bumper bracket holder base 13. The bumper bracket holder base 13 has a corrugated segmental upper face 14, and a practically flat lower face 15. The flat lower face 15 fits upon the upper face of the side bar 6. The face 14 is bifurcated to form a slot 16, and walls 17 and 18 extend downwardly on each side of the slot from the face 14 to form the face 15. Ears 19 and 20 extend outwardly from the centers of the lower edges of the walls 17 and 18, and a U-shaped clip 21 is placed around the side bar 6 and inserted upwardly through the ears 19 and 20, and nuts 22 and 23 are applied to the end of the clip to clamp the base rigidly upon the side bar 6. A bolt 24 is inserted upwardly through the slot 16 and the head 25 of the bolt engages the metal on each side of the slot, and the bolt is inserted through the segmental gripping plate 12, and a nut 26 is applied to the bolt, so that when the bolt is loosened the bumper 1 may be raised or lowered to the desired position, and then the bolt tightened to hold the bumper in its adjusted position.

Various changes may be made without departing from the spirit of my invention as claimed.

I claim:

1. A bumper bracket holder comprising the combination with an S-shaped bracket having a segmental gripping plate at one end of a bumper bracket holder base, having a segmental upper face to fit the gripping plate and a practically flat lower face and laterally extending ears, the segmental upper face being longitudinally bifurcated to form a bolt slot, and a bolt inserted upwardly through the slot and through the gripping plate.

2. A bumper bracket holder comprising a base adapted to be attached to an automobile frame and having a segmental gripping face, there being a longitudinal slot through the gripping face; a bracket having a segmental gripping plate fitting the gripping face of the base; and a bolt inserted through the slot and through the bracket and adapted to move back and forth in the slot and adapted to be tightened to hold the segmental gripping plate of the bracket in an adjusted position upon the base.

In testimony whereof I have signed my name to this specification.

PHILIP RIEDELE.